Figure 1:
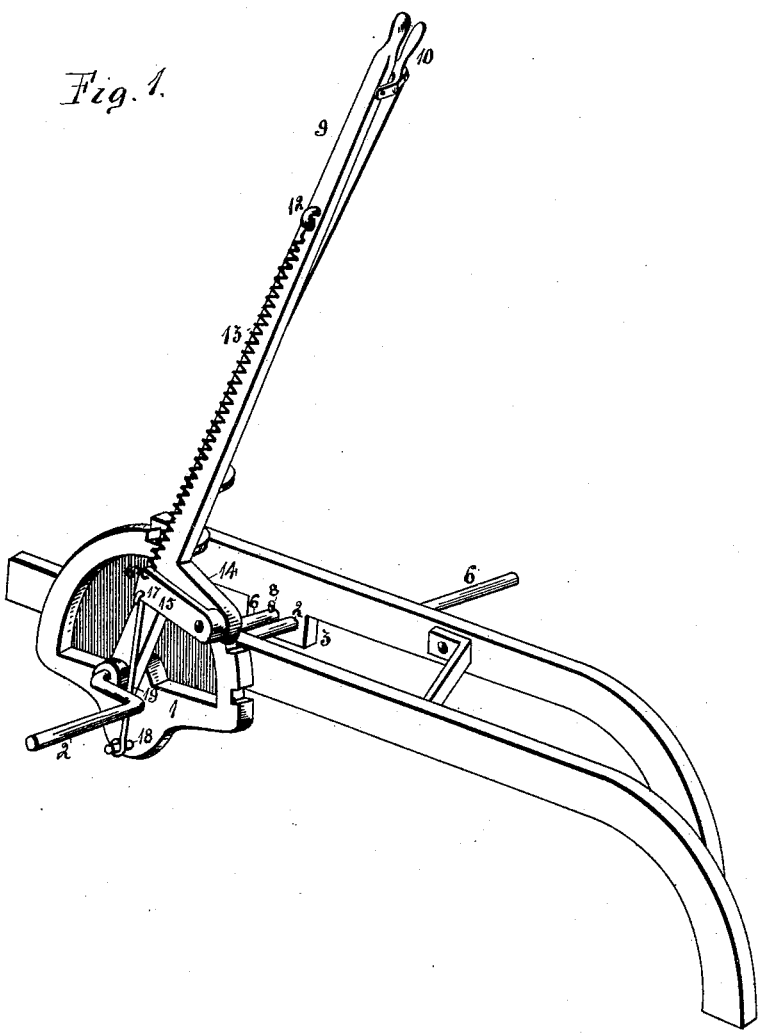

(No Model.) 2 Sheets—Sheet 1.

H. LINDESTROM.
COMPENSATING LEVER FOR PLOWS.

No. 489,486. Patented Jan. 10, 1893.

Witnesses:
E. Behel.
L. L. Miller

Inventor:
Hjalmar Lindestrom
By A. O. Behel
Atty.

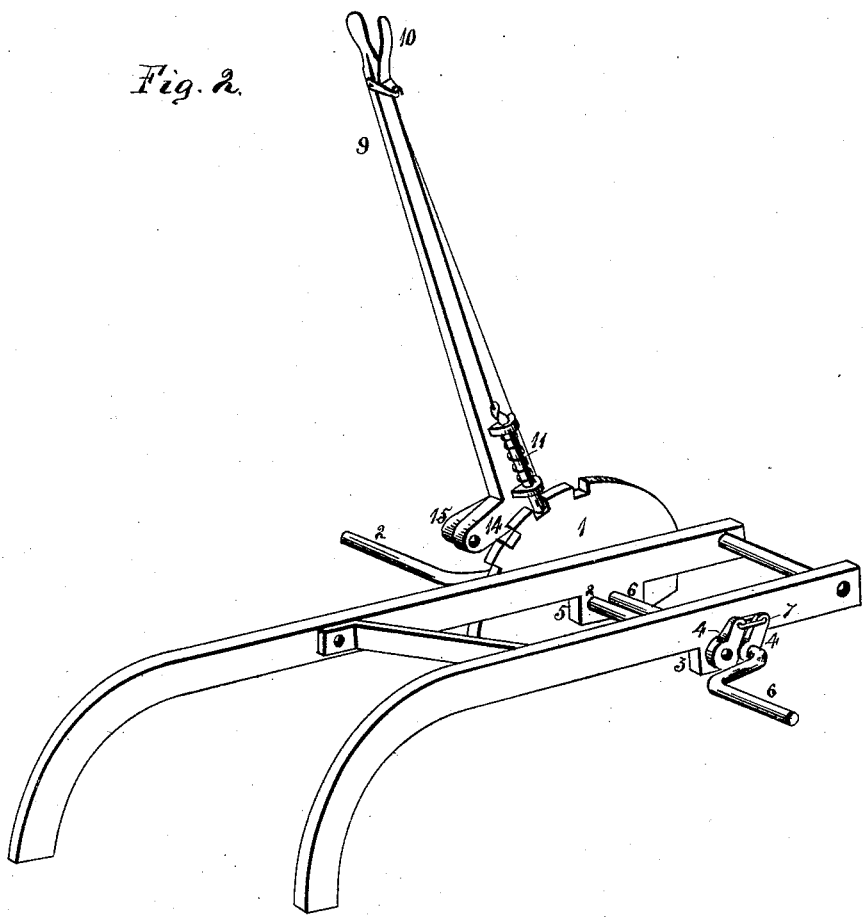

UNITED STATES PATENT OFFICE.

HJALMAR LINDESTRÖM, OF MOLINE, ILLINOIS.

COMPENSATING LEVER FOR PLOWS.

SPECIFICATION forming part of Letters Patent No. 489,486, dated January 10, 1893.

Application filed March 19, 1892. Serial No. 425,628. (No model.)

*To all whom it may concern:*

Be it known that I, HJALMAR LINDESTRÖM, a subject of the King of Sweden and Norway, residing at Moline, county of Rock Island, State of Illinois, have invented certain new and useful Improvements in Compensating Levers for Plows and other Agricultural Implements, of which the following is a specification.

The object of this invention is to provide a lever in which the energy of the movement in one direction will be stored for application in overcoming the resistance of its opposite movement, for example the raising and lowering of a weight where the downward movement of the weight is caused to store force in the lever mechanism to aid in the lifting thereof.

In the accompanying drawings,—Figure 1, is a perspective representation of my compensating lever as applied to a gang-plow frame, the supporting wheels of the latter being removed so as not to obstruct the view of the lever. Fig. 2, is also a perspective representation of the same looking at the opposite, or left hand side thereof.

In the present application of my lever I affix to the frame work of the plow the notched sector 1, through the center of which and through a lug 5, depending from the plow frame the shaft 2, extends. The inner end of this shaft is journaled in a bearing in the lug 3, and its outer end is bent in crank form furnishing an axle for one of the supporting wheels of the plow. Extending parallel with this shaft and at a little distance therefrom is the shaft 6, having the same crank form as does the shaft 2, and journaled in bearings in the lugs 3, and 5, beside those of the former shaft. The outer end of this shaft forms the axle for the remaining supporting wheel.

Rigidly affixed to each of the shafts 2 and 6 close beside the bearing lug 3 and just without the frame work I provide the arms 4, perforated at their outer ends and there connected by the link 7, by means of which the shafts are oscillated in unison. A key 8, extending through a hole in the shaft 6, just within the bearing lug 3, prevents displacement of the shaft. The lever 9, is mounted upon and has a positive engagement with the shaft 2, just outside the sector 1, and the ordinary hand latch 10, and spring detent 11, thereon engage the notched sector 1. An eye 12, extends from the outer face of the lever 9, near the upper end thereof and this eye forms the attachment for one end of an extension coiled spring 13. An arm 14, extends rearward from the lever near its lower end and pivoted to the outer end of this arm a second arm 15, extends forward. This latter arm is provided with two holes 16 and 17 in its forward end the first of which provides a point of attachment for the lower end of the extension spring 13. The sector 1, extends downward below the shaft 2, and projecting from this lower portion the stud 18, extends. A rod 19, has an eye which encircles the stud 18, and extending through the hole 17 in the arm 15 connects it to the arm.

It will be understood from the foregoing description that as the supporting wheels are journaled upon crank arms and these cranks are capable of an oscillation in unison the effect of their movement will be to raise or lower the plows. The weight of the plows and their tending to run into the soil makes the lowering of them an easy matter, in fact their descent must be restrained by holding back upon the lever. My compensating lever acts in this manner for it will be observed that when the lever is in a horizontal position the distance between the eye 12, of the lever and the stud 18 through the free end of the arm 15, is at its least and the spring 13, is loose. As the lever is raised and the plows descend this distance is increased and the spring consequently extended as the lever rises storing energy in the spring which is applied in lifting the weight of the plows when the lever is depressed.

It is evident that this form of lever may be employed in other makes of agricultural implements where the compensating force of the spring may be required.

I claim as my invention.

1. In a compensating lever, the combination of a pivoted lever a notched sector, a detent on the lever, a spring attached to the lever and to a point stationary with reference to the lever and a projection from the lever for holding the spring in line therewith.

2. In a compensating lever the combination of a pivoted lever, a notched sector, therefor, a detent on the lever, a pivoted arm on the lever, a spring attached to the lever, and to the arm and a link connection between the arm and a point stationary in relation to the lever.

3. In a compensating lever the combination of a pivoted lever, a notched sector therefor, a detent on the lever, an extension from the lever, an arm pivoted to the extension, a spring attached to the lever and to the arm and a link connection between the arm and a point stationary in relation to the lever.

4. In a wheel plow the combination of a carriage body, two crank shafts thereon, which receive supporting wheels, a connection between the shafts, a notched sector on the carriage, a compensating lever on one of the shafts said lever comprising the lever proper, a detent thereon, a spring connected to the lever and to a point stationary in reference thereto and a projection from the lever for holding the spring in line therewith.

HJALMAR LINDESTRÔM.

Witnesses:
E. EDVARD HEDBERG,
J. E. SPENCER.